United States Patent [19]

Le Compte

[11] Patent Number: 5,042,899
[45] Date of Patent: Aug. 27, 1991

[54] AIR BEARING FOR AN OPTICAL FIBER

[75] Inventor: George W. Le Compte, Tuscon, Ariz.

[73] Assignee: Hughes Aircraft Company, Los Angeles, Calif.

[21] Appl. No.: 558,997

[22] Filed: Jul. 26, 1990

[51] Int. Cl.$^5$ .................... G02B 6/36; G02B 7/26
[52] U.S. Cl. ......................... 385/134; 385/53
[58] Field of Search .................. 350/96.20, 96.23

[56] References Cited

U.S. PATENT DOCUMENTS 4,521,072 6/1985 Cholley et al. ............... 350/96.23
4,776,910 10/1988 Taylor et al. ............... 350/96.23

Primary Examiner—William L. Sikes
Assistant Examiner—Robert E. Wise
Attorney, Agent, or Firm—R. M. Heald; C. D. Brown; W. K. Denson-Low

[57] ABSTRACT

A curvilinear bearing (10) is provided for guiding an optical fiber (14) along a curved path. The bearing (10) has a first ribbon (16) with an open-bottom channel (20) of such dimensions and geometry to conform to a fiber (14) received therein. A second ribbon (18) has a central channel (22) formed in one surface with a pair of inlet passages (24, 26), one on each side of the central channel, and generally parallel to the channel. Several connecting passages (28, 30, 32, 34) extend between the central channel (22) and each inlet passage (24, 26). The second ribbon (18) is assembled to the first ribbon (16), the central channel (22) and open bottom of channel (20) being aligned. The ribbon assembly can be formed about a cylindrical substrate (37). Pressurized air added to the inlet passages (24, 26) forms a cushion of air in the channel (20) to support the fiber (14). Optionally, a pair of ribbons (42, 50) can be spirally wound onto each other to form a spiral bearing path (52) between edges of the outer ribbon (50).

13 Claims, 1 Drawing Sheet

5,042,899

AIR BEARING FOR AN OPTICAL FIBER

BACKGROUND OF THE INVENTION

1. Field of the Invention

The present invention relates generally to an air bearing for an optical fiber and, more particularly, to a curvilinear air bearing.

2. Description of Related Art

Heretofore transport applications of an optical fiber have all relied upon apparatus including pulleys where changes in direction of travel were required. Not only do conventional pulleys inject a substantial amount of friction into the operation because of the bearing journaling, but they also present problems due to the possible accumulation of contaminants on their running surfaces. In explanation, the outer coating of a typical optical fiber includes a soft buffer which is vulnerable to damage by particles which may have become lodged on the pulley surfaces resulting in a continuing sequence of punctures to the buffer. Penetration of the buffer coating in this way will produce a corresponding reduction of efficiency of light transfer along the optical fiber which is undesirable.

In pulley systems, when increases in fiber dispensing speed occur this results in fiber tension increases because of pulley inertia. Optical fibers are typically operated at very low tensions because of possibility of damage to the fiber or producing conditions that would reduce light signal transmission efficiency (e.g., microbending).

It is accordingly a desideratum to provide means for transporting an optical fiber along a path with one or more changes in direction of travel without exposing the fiber to possibility of damage to the buffer coating, and, also, without otherwise subjecting the fiber to undue stressing or bending which could damage the fiber or reduce light signal transmission.

SUMMARY OF THE INVENTION

An optical fiber includes a glass core typically surrounded by a buffer coating which not only protects the glass but also serves as a means for aiding the reflection of the optical signal along the glass core. The overall cross-sectional dimensions of the total optical fiber with buffer coating is measured in thousandths of an inch.

In its broadest conception, the air bearing of the present invention includes a first ribbon of copper, for example, having an open-bottom channel etched therein conforming precisely to the outer contour of the fiber. More particularly, the channel dimensions are such as to fully receive about one-half of the cross-section of a buffer covered optic fiber. A second metal ribbon or layer has a plurality of shallow spaced-apart recesses on one major surface. The second ribbon is assembled to the lower surface of the first ribbon with the recesses extending transversely of the first ribbon channel. Pressurized air is admitted into the channel via the recesses in the second ribbon and acts to support the fiber within the channel in a spaced relationship from the channel walls.

As to general operation, movement of the fiber along the surface produces an increase in the pressure of the air cushion immediately adjacent the channel surface. That is, the closer the fiber moves to a channel surface, the higher the pressure gets. This tends to even out the positioning of the fiber within the channel and if the fiber tension does not exceed some predetermined maximum, the adjacent facing surface of the fiber is held spaced by a cushion of pressurized air from the channel wall and moves therealong on what can be termed an "air bearing".

DESCRIPTION OF A PREFERRED EMBODIMENT

Optical fibers are used in the transmission of optical signals for a great variety of uses such as establishing a data link between a missile and equipment located at the launch site, for example. Since these fibers have cross-sections measured in the thousandths of an inch they require care in handling to prevent breakage or other impairment. At times it is necessary to move an extensive length of an optical fiber along a path which may include a change of a direction such as, for example, when dispensing a fiber from a wound pack or during tests of a fiber to determine certain physical characteristics (e.g., tensile strength, bending stresses). In the past, conventional mechanical pulleys have been used where the fiber is received within a circumferential groove of the pulley resulting in frictional drag, wear on the fiber, or, on occasion, damage sharply reducing the usefulness of the fiber.

Mechanical pulleys and other conventional bearing devices are not satisfactory for use to redirect an optical fiber for a number of reasons. First of all, the fiber must not be stressed unduly, kinked, nor can it be turned over too sharp a pulley curvature without risking the possibility of damaging the fiber or reducing the efficiency of optical signal transmission along the fiber. Also, a conventional pulley can have foreign material collect in the pulley groove which can produce a number of tears in the cladding materials surrounding the optical fiber glass core resulting in impairment of the internal reflectance. The cladding aids in transferring the light beam along the glass core, and if torn leaks the light signal and reduces signal transmission efficiency.

Furthermore, when the fiber rate of speed is increased as it moves over a revolving pulley, pulley inertia will increase the fiber tension, which is undesirable for reasons noted. On the other hand, if the fiber speed is reduced, the pulley inertia will tend to continue feeding the fiber at a rate exceeding its new speed, which is also undesirable.

Accordingly, the present invention was devised to provide a bearing specifically for use in directing filamentary material such as an optical fiber along a predetermined path without requiring direct physical contact with the fiber by a pulley surface, for example.

Figure 1:
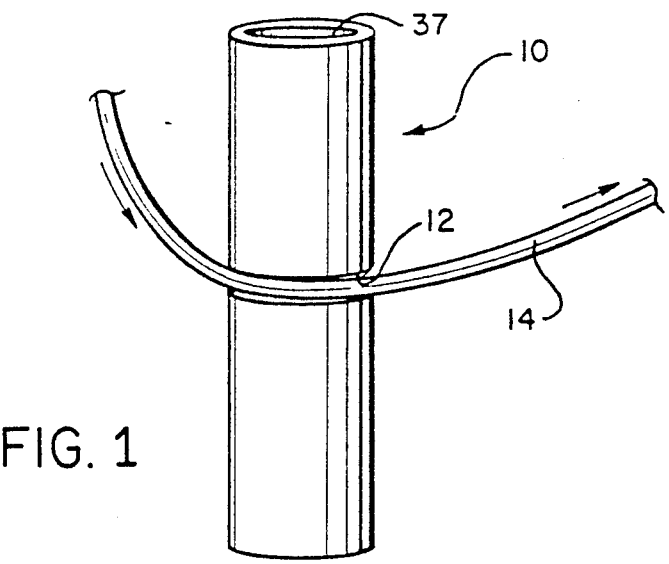
FIG. 1 is a side elevational view of the air bearing of the present invention shown with an optical fiber located thereon.

Turning now to the drawings and particularly FIG. 1, there is shown a bearing according to the present invention enumerated generally as 10 and which is seen to be of an overall generally cylindrical shape with a groove 12 extending partway around its circumference. An optical fiber 14, the cross-sectional dimensions of which closely match that of the groove 12, is received within the groove and, in a way that will be more particularly described, is supported on a cushion of pressurized air. An air cushion is vastly superior to other types of bearings or direction changing apparatus such as a mechanical pulley in that there is no direct contact of the optical fiber cladding material with a solid surface and, therefore, injury from that source is avoided.

Figure 2:
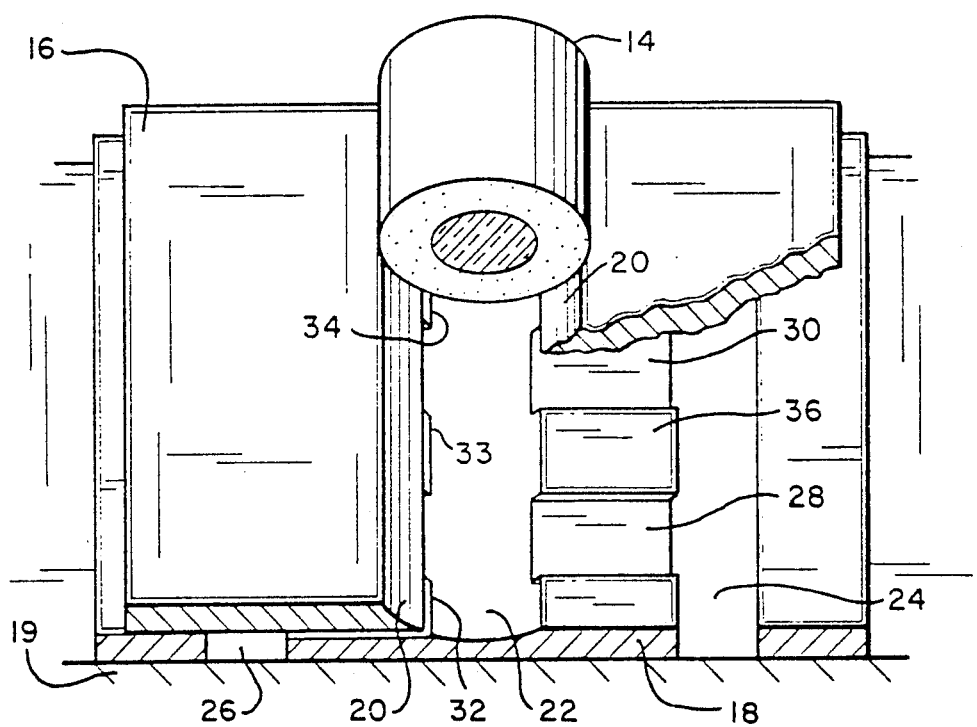
FIG. 2 depicts a top plan partially sectional view of the invention.

For the ensuing details of the air bearing construction of this invention, reference is now made simultaneously to FIG. 2. The bearing 10 includes first and second ribbons 16 and 18 constructed of metal or plastic which are assembled together to form a unitary device. The two ribbons may alone provide sufficient rigidity to maintain dimensional and geometric integrity during use; however, in most cases, it is advisable that the ribbons 16 and 18 be mounted onto a substrate 19 to give the desired form and to obtain additional rigidity.

The ribbon 16 includes an open bottom channel 20, the sides of which are formed into a substantially semi-cylindrical curve with the overall depth being approximately equal to one-half the outer diameter of the optical fiber 14 (FIG. 2). The channel length is preferably slightly longer than the curve about which it is desired to redirect the fiber along a different path (FIG. 1). For example, in making between 60-90 degree turn as shown in FIG. 1, the channel length would be approximately one-third of the circumference of the cylindrical bearing. Otherwise, the upper and lower surfaces of the metal ribbon 16 are smooth and flat. It is also important to note the channel 20 is formed in a manner so as to insure smooth side walls and not have any burs, sharp edges or other elements which could contact and damage the fiber cladding during use.

The second metal ribbon 18 has an overall geometry and is of such dimensions as to substantially match those of the upper ribbon 16. One major surface of the second ribbon includes an elongated shallow, cylindrically curved recess 22 which, on assembly of the two ribbons together as will be shown, can be aligned with and extend along the channel 20 of ribbon 16. At each side of the shallow recess 22 and generally parallel thereto are air inlet passages 24 and 26 which also consist of a shallow recess or groove formed in the upper surface of the ribbon 18. Additionally, a plurality of connecting passages 28 and 30, 32, 33 and 34 are formed in the upper surface of the ribbon 18 with one end of each opening into the central channel 22 and the opposite end into either the inlet 24 or 26, as the case may be. The exact number and lateral spacing of these connecting passages required depends upon the overall length of the channel 20. In between each adjacent pair of connecting passages there is an upstanding wall, such as the wall 36, which serves to separate the adjacent passages for separate and individual conduction of pressurized air therealong.

In assembly, the upper or first ribbon 16 is located over the second ribbon 18 (FIG. 2) with the concave side of channel 20 facing outwardly and the various connecting passages 28, 30, 32, 33 and 34 and the shallow recess 22 of the second ribbon directly facing the lower surface of the first ribbon.

The assembled ribbons may be secured together into a unitary construction by using an epoxy, for example, which will interconnect the top surface of the lands of the separator walls 36 to the lower surface of the first ribbon. The entire assembly can then be formed to desired shape, or, alternatively, mounted onto a rigid substrate 19 preformed into a configuration such as the cylinder 37 shown in FIG. 1, for example. Optionally, the second ribbon 18 may be initially formed onto the substrate 37, after which the first ribbon 16 is adhered over the second ribbon in proper registration.

In use of the described bearing, the inlet passages 24 and 26 are both interconnected with a source of pressurized air which will move through the interconnecting passages 28, 30, 32, 33, 34 and so forth to exit through the channel 20 open bottom 32 of the first ribbon as shown by the arrows. The continuous air flow in this direction will provide the necessary compressed air cushion for supporting the glass fiber 14. When so supported the fiber can be moved longitudinally within the channel 20 (which is identical to the direction of movement of the fiber as shown by the arrow in FIG. 1) and all without direct contact of the fiber with any part of the first ribbon 16 being required. In this way, the fiber is protected from both frictional wear from engagement with the bearing as well as avoiding the possibility of repeated damage to the glass fiber cladding on being scratched or torn from embedded or otherwise fixedly located foreign matter on the surface of a pulley, for example.

The two layers 16 and 18 forming the air bearing can be made of thin plates of any desired metal, plastic, or ceramic. However, preferably in view particularly of the very small dimensions of the optical fiber 14, the plates or ribbons are constructed of copper deposited onto a substrate from which it can be peeled off in accordance with well known techniques utilized in the circuit board interconnection field.

Figure 3:
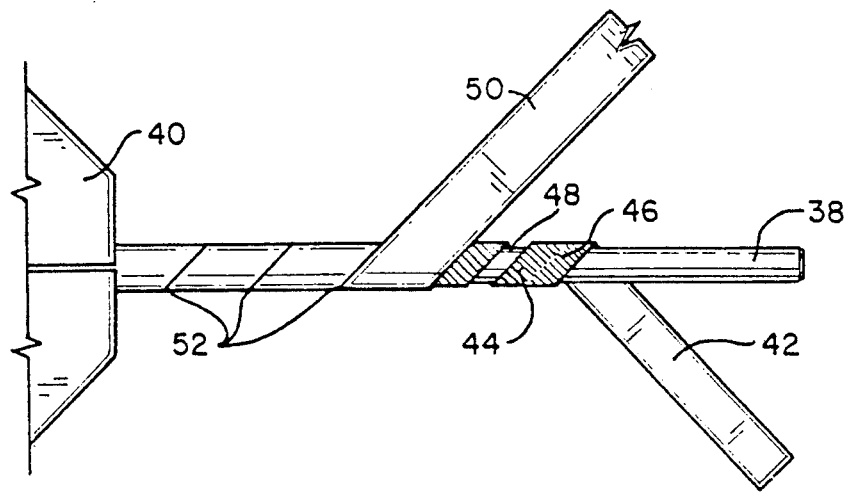
FIG. 3 shows an application of the present invention to the provision of a helical path bearing.

FIG. 3 shows a side elevation view of a technique for making an air bearing having a generally helically wound or spiral path. As shown there, a cylindrical substrate 38 has one end fixed within a rotatable chuck 40. As a first step, an elongated strip of metal or plastic 42 having on one major surface a plurality of transversely extending shallow grooves 44 separated by intervening walls 46, is helically wound onto the substrate 38 in a continuous manner with a slight space 48 existing between adjacent turns. A second strip 50 of identical width dimensions as the first strip is then wound over the first strip 42 at the same angle as the strip 42 is wound onto the substrate 48. It is important to note that the second strip should be wound so that its edge portions will align between the underlying space 48 formed between adjacent turns of strip 42 and be spaced apart slightly to form a bearing channel 52 of suitable dimensions to accommodate an optical fiber. With the end portions of both strips adequately secured to form a unitary relationship with the substrate 38, pressurized air introduced along the shaft of the substrate 38 will pass through the various connecting passage grooves 44, be emitted via the intervening spaces 48 and outwardly through the channel 52 between adjacent turns in the upper ribbon. At the conclusion of the formation, the entire assembly is removed from the chuck 40 and otherwise suitably mounted for use. It is advisable particularly when the number of bearing loops or paths are considerable to apply pressurized air from both ends of the bearing in order to insure adequate pressurized air is provided along the entire bearing.

In use, an optical fiber is wound into the channel 52 existing between adjacent turns of the upper ribbon and when the pressurized air is introduced to the bearing, the optical fiber can be readily moved along its spiral path without experiencing frictional drag or risking contact damage. The described bearing can be usefully employed in, among other things, a bending stress proof tester for optical fibers, a part of which requires looping the fiber in a helical path, maintaining this looped position by applying longitudinal stress to the fiber.

In a practical construction of the bearing shown in FIG. 3, a bend radius of approximately ⅛ of an inch is obtained by following a 45 degree helical path on a rod substrate ⅛ of an inch in diameter.

Although the foregoing has been a description and illustration of specific embodiments of the invention, various modifications and changes thereto can be made by persons skilled in the art without departing from the scope and spirit of the invention as defined by the following claims.

What is claimed is:

1. A bearing for a filament, comprising:
    a first ribbon having a channel configured to approximate the filament geometry formed in one surface and extending completely through the ribbon thickness,
    a second ribbon having, on one major surface,
        a shallow recess extending longitudinally in a first direction, first and second inlet passages spaced from and on opposite sides of said shallow recess, respectively, and
        a plurality of connecting passages extending between the shallow recess and the first and second inlet passages;
    said first and second ribbons being unitarily sandwiched together with the second ribbon surface containing the shallow recess, inlet passages and connecting passages secured to the first ribbon major surface opposite that including the channel.

2. A bearing as in claim 1, in which the first and second ribbons are constructed of thin wall copper.

3. A bearing as in claim 1, in which the first and second ribbons are constructed of synthetic plastic.

4. A bearing as in claim 1, in which the first and second ribbons are secured together by a quantity of an epoxy.

5. A bearing as in claim 1, in which the first ribbon channel has curved side walls conforming to the filament shape and a depth equal to approximately one-half of the filament cross-section.

6. A bearing as in claim 1, in which the filament is an optical fiber enclosed within a buffer coating.

7. A bearing as in claim 1, in which there is further provided a rigid substrate and said first and second ribbons are secured to the substrate.

8. A bearing as in claim 7, in which the rigid substrate is cylindrical and the first and second ribbons are conformed and secured to the circumferential peripheral surface.

9. A spiral bearing for a filament, comprising:
    a generally cylindrical substrate;
    an elongated first ribbon having a plurality of transversely extending groove passages on one major surface thereof, said first ribbon being spirally wound onto the substrate in a continuously edge-spaced relation with the groove passages all facing outwardly;
    a second ribbon spirally wound over the first ribbon in covering relation to the edge spaces of the first ribbon, said second ribbon having a continuous and substantial space maintained between its edges of a dimension closely approximating the cross-sectional dimension of the filament for receiving the filament therein.

10. A spiral bearing as in claim 9, in which the second ribbon has a thickness approximately equal to one-half the filament thickness.

11. A spiral bearing as in claim 9, in which the first and second ribbons are constructed of thin wall copper.

12. A spiral bearing as in claim 9, in which the first and second ribbons are constructed of synthetic plastic.

13. A spiral bearing as in claim 9, in which the first and second ribbons are secured together by a quantity of an epoxy.

* * * * *